(12) United States Patent       (10) Patent No.:     US 7,777,805 B2
Ogami                            (45) Date of Patent:    Aug. 17, 2010

(54) IMAGE CAPTURING APPARATUS FOR PERFORMING PHOTOGRAPHY IN A LIVE VIEW DISPLAY STATE AND CONTROL METHOD THEREOF

(75) Inventor: Tetsuji Ogami, Hanyu (JP)

(73) Assignee: Canon Kabushiki Kaisha, Tokyo (JP)

( * ) Notice: Subject to any disclaimer, the term of this patent is extended or adjusted under 35 U.S.C. 154(b) by 417 days.

(21) Appl. No.: 11/868,763

(22) Filed: Oct. 8, 2007

(65) Prior Publication Data

US 2008/0111902 A1    May 15, 2008

(30) Foreign Application Priority Data

Nov. 9, 2006   (JP) ............................ 2006-304410

(51) Int. Cl.
H04N 5/238   (2006.01)
H04N 5/235   (2006.01)
G03B 7/00    (2006.01)

(52) U.S. Cl. .................. 348/364; 348/362; 348/366
(58) Field of Classification Search ............. 348/221.1, 348/227.1, 362, 364, 366, 367, 369, 370, 348/371; 396/157, 166
See application file for complete search history.

(56) References Cited

U.S. PATENT DOCUMENTS

2001/0003466 A1* 6/2001 Kubo .......................... 348/366
2004/0080659 A1* 4/2004 Iwane et al. ................. 348/342
2004/0227837 A1* 11/2004 Ito ............................... 348/335
2005/0068428 A1* 3/2005 Uchida ..................... 348/231.3
2005/0122409 A1* 6/2005 Takeshita .................. 348/223.1
2006/0221223 A1* 10/2006 Terada .................... 348/333.05
2006/0262659 A1* 11/2006 Kurosawa ....................... 369/1
2007/0153112 A1  7/2007 Ueda et al.

FOREIGN PATENT DOCUMENTS

CN    101326815 A    12/2008
JP    2005-295577    10/2005

OTHER PUBLICATIONS

The above references were cited in a Apr. 10, 2009 Chinese Office Action that issued in Chinese Patent Application No. 200710165955. 2, which is enclosed with English Translation.

* cited by examiner

Primary Examiner—Kelly L Jerabek
(74) Attorney, Agent, or Firm—Cowan, Liebowitz & Latman, P.C.

(57) ABSTRACT

This invention allows executing proper photometry within a short time even when a single-lens reflex type image capturing apparatus performs flash photography using an electronic viewfinder. When performing photography from a live view display state using a flash unit which illuminates an object, a shutter front curtain is closed, and a quick return mirror is driven into a photographing optical path. After a photometry sensor near an optical viewfinder temporarily measures reflected light from the object, photography is executed.

4 Claims, 9 Drawing Sheets

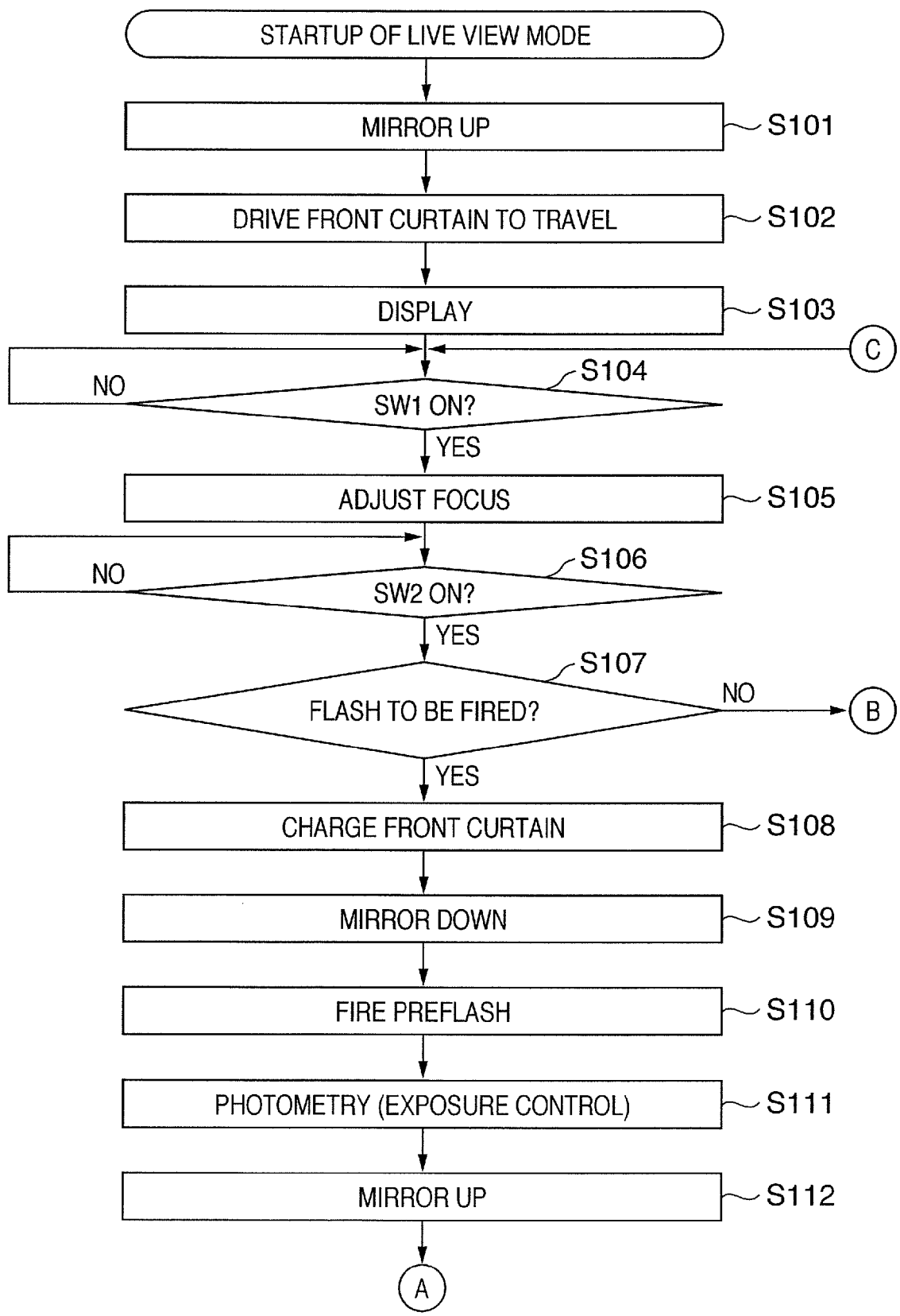

IMAGE CAPTURING APPARATUS FOR PERFORMING PHOTOGRAPHY IN A LIVE VIEW DISPLAY STATE AND CONTROL METHOD THEREOF

BACKGROUND OF THE INVENTION

1. Field of the Invention

The present invention relates to a photometry technique in an image capturing apparatus capable of displaying, in the live view, an image which is obtained from an image sensor and is to be captured.

2. Description of the Related Art

Generally in a single-lens reflex type digital camera using an image sensor such as a CCD, a reflecting mirror is inserted in a photographing optical path extending from a photographing lens to an image sensor, so as to be directed obliquely upward in order to observe an object image. The reflecting mirror guides light from an object to an optical viewfinder. When shooting an image with the image sensor, the mirror is pivoted and retracted from the optical path to guide light from the object to the image sensor. That is, immediately before shooting an image, i.e., exposing the image sensor, the mirror is positioned on the optical path to reflect light from the object toward the viewfinder optical system. When shooting an image, the mirror is retracted from the optical path to guide light to the image sensor. Immediately after shooting an image, the mirror is returned to the optical path. A mirror of this type is called a quick return mirror.

In a single-lens reflex type digital camera having this arrangement, the quick return mirror exists on the optical path of the photographing lens in a mode other than actual photography, so no object light enters the image sensor. For this reason, the digital camera cannot perform a live view display operation of displaying an object image sensed by the image sensor in real time on a display arranged on the rear surface of the camera. The display cannot be used as an electronic viewfinder. If the electronic viewfinder can be used in addition to the optical viewfinder, this improves user friendliness. Demand has arisen for a single-lens reflex type digital camera also having the electronic viewfinder function.

To meet this demand, for example, Japanese Patent Laid-Open No. 2005-295577 proposes a digital camera having a half-mirror as a quick return mirror. In this arrangement, even when the half-mirror exists on the optical path, light enters the image sensor. The image sensor can generate an image, implementing a live view, i.e., electronic viewfinder function. Since an object image reflected by the half-mirror also enters the viewfinder optical system, the optical viewfinder can also be utilized. When shooting an image to be recorded, all light from the photographing lens can be used for photography by retracting the half-mirror from the optical path.

However, in this arrangement, light guided to the image sensor in live view display is only part of the total amount of light which have passed through the photographing lens. No high-quality live view image can be obtained by photography in a dark environment.

To attain a high-quality live view image, the quick return mirror is ideally retracted from the optical path of the photographing lens to guide all the light from the photographing lens to the image sensor.

In a single-lens reflex type digital camera, the viewfinder optical system incorporates a photometry sensor which detects the light quantity in the field. A light beam from the photographing lens is guided to the photometry sensor via the quick return mirror and pentaprism, performing field photometry. When the quick return mirror is retracted from the optical path of the photographing lens in order to use the electronic viewfinder function, the photometry sensor cannot perform field photometry.

Hence, field photometry is done using an image signal generated by the image sensor when the electronic viewfinder function is used. In this case, when natural light is measured, the time lag until the digital camera shifts from the electronic viewfinder operation to actual photography is relatively short because the image sensor always generates an image signal to perform photometry during the electronic viewfinder operation.

In flash photography, however, a preflash must be fired before actual photography. The emitted light quantity of the preflash and the light quantity distribution of reflected light from an object are detected to determine the actual emission quantity of the flash on the basis of these light quantities. Flash photography in the live view mode requires an operation to fire a preflash before shooting an image, read out an image formed by the preflash from the image sensor, and determine the actual emission quantity. This increases the time lag from pre-emission to actual emission. Since the image sensor has an array of many pixels, a long time is taken to read out signals. Photometry using the image sensor takes a longer photometry time than in that using a general photometry sensor, resulting in a long time lag. The image sensor has a narrower dynamic range than that of a general photometry sensor, and it is difficult to obtain an accurate photometric value.

SUMMARY OF THE INVENTION

The present invention has been made to overcome the conventional drawbacks, and has as its object to allow executing proper photometry within a short time even when a single-lens reflex type image capturing apparatus performs flash photography using an electronic viewfinder.

In order to solve the above problems and to achieve the above object, according to the first aspect of the present invention, there is provided an image capturing apparatus comprising an image sensor which photo-electrically converts an object image formed via a photographing lens, a shutter having a shutter front curtain and a shutter rear curtain which are interposed between the photographing lens and the image sensor, the shutter front curtain being opened at a timing to start exposure of the image sensor, and the shutter rear curtain being closed at a timing to end the exposure of the image sensor, an optical viewfinder which is used to observe an object image using a light beam from the photographing lens, a quick return mirror which guides a light beam from the photographing lens to the optical viewfinder, a mirror driving unit adapted to drive and move the quick return mirror between a state in which the quick return mirror is positioned in a photographing optical path and a state in which the quick return mirror is retracted from the photographing optical path, a photometry sensor which is arranged near the optical viewfinder and performs photometry by receiving, via the quick return mirror, reflected light entering from an object via the photographing lens, a display unit adapted to display an object image obtained by the image sensor, and a control unit adapted to, when performing photography using a flash unit which illuminates an object, from a live view display state in which the display unit sequentially displays object images obtained by the image sensor by opening the shutter front curtain in advance and retracting the quick return mirror from the photographing optical path, control to close the shutter front curtain, drive the quick return mirror into the photographing optical path, preliminarily emit light by the flash unit, temporarily measure reflected light from the object by the photometry sensor, then retract the quick return mirror again from the photographing optical path, and perform exposure of the image sensor accompanied by actual emission of the flash unit.

According to the second aspect of the present invention, there is provided an image capturing apparatus comprising an image sensor which photo-electrically converts an object image formed via a photographing lens, a shutter having a shutter front curtain and a shutter rear curtain which are interposed between the photographing lens and the image sensor, the shutter front curtain being opened at a timing to start exposure of the image sensor, and the shutter rear curtain being closed at a timing to end the exposure of the image sensor, an optical viewfinder which is used to observe an object image using a light beam from the photographing lens, a quick return mirror which guides a light beam from the photographing lens to the optical viewfinder, a mirror driving unit adapted to drive and move the quick return mirror between a state in which the quick return mirror is positioned in a photographing optical path and a state in which the quick return mirror is retracted from the photographing optical path, a photometry sensor which is arranged below the quick return mirror and performs photometry by receiving light that enters from an object via the photographing lens and is reflected by the shutter front curtain, a display unit adapted to display an object image obtained by the image sensor, and a control unit adapted to, when performing photography using a flash unit which illuminates an object, from a live view display state in which the display unit sequentially displays object images obtained by the image sensor by opening the shutter front curtain in advance and retracting the quick return mirror from the photographing optical path, control to close the shutter front curtain, preliminarily emit light by the flash unit, temporarily measure reflected light from the shutter front curtain by the photometry sensor, and then perform exposure of the image sensor accompanied by actual emission of the flash unit.

According to the third aspect of the present invention, there is provided a method of controlling an image capturing apparatus including an image sensor which photo-electrically converts an object image formed via a photographing lens, a shutter having a shutter front curtain and a shutter rear curtain which are interposed between the photographing lens and the image sensor, the shutter front curtain being opened at a timing to start exposure of the image sensor, and the shutter rear curtain being closed at a timing to end the exposure of the image sensor, an optical viewfinder which is used to observe an object image using a light beam from the photographing lens, a quick return mirror which guides a light beam from the photographing lens to the optical viewfinder, a mirror driving unit adapted to drive and move the quick return mirror between a state in which the quick return mirror is positioned in a photographing optical path and a state in which the quick return mirror is retracted from the photographing optical path, a photometry sensor which is arranged near the optical viewfinder and performs photometry by receiving, via the quick return mirror, reflected light entering from an object via the photographing lens, and a display unit adapted to display an object image obtained by the image sensor, the method comprising the step of, when performing photography using a flash unit which illuminates an object, from a live view display state in which the display unit sequentially displays object images obtained by the image sensor by opening the shutter front curtain in advance and retracting the quick return mirror from the photographing optical path, controlling to close the shutter front curtain, drive the quick return mirror into the photographing optical path, preliminarily emit light by the flash unit, temporarily measure reflected light from the object by the photometry sensor, then retract the quick return mirror again from the photographing optical path, and perform exposure of the image sensor accompanied by actual emission of the flash unit.

According to the fourth aspect of the present invention, there is provided a method of controlling an image capturing apparatus including an image sensor which photo-electrically converts an object image formed via a photographing lens, a shutter having a shutter front curtain and a shutter rear curtain which are interposed between the photographing lens and the image sensor, the shutter front curtain being opened at a timing to start exposure of the image sensor, and the shutter rear curtain being closed at a timing to end the exposure of the image sensor, an optical viewfinder which is used to observe an object image using a light beam from the photographing lens, a quick return mirror which guides a light beam from the photographing lens to the optical viewfinder, a mirror driving unit adapted to drive and move the quick return mirror between a state in which the quick return mirror is positioned in a photographing optical path and a state in which the quick return mirror is retracted from the photographing optical path, a photometry sensor which is arranged below the quick return mirror and performs photometry by receiving light that enters from an object via the photographing lens and is reflected by the shutter front curtain, and a display unit adapted to display an object image obtained by the image sensor, the method comprising the step of, when performing photography using a flash unit which illuminates an object, from a live view display state in which the display unit sequentially displays object images obtained by the image sensor by opening the shutter front curtain in advance and retracting the quick return mirror from the photographing optical path, controlling to close the shutter front curtain, preliminarily emit light by the flash unit, temporarily measure reflected light from the shutter front curtain by the photometry sensor, and then perform exposure of the image sensor accompanied by actual emission of the flash unit.

Further features of the present invention will become apparent from the following description of exemplary embodiments with reference to the attached drawings.

BRIEF DESCRIPTION OF THE DRAWINGS

FIGS. 4A-4C are flowcharts showing an operation when the single-lens reflex digital camera according to the first embodiment shoots an image in the live view mode.

DESCRIPTION OF THE EMBODIMENTS

Preferred embodiments of the present invention will be described in detail below with reference to the accompanying drawings.

First Embodiment

Figure 1:
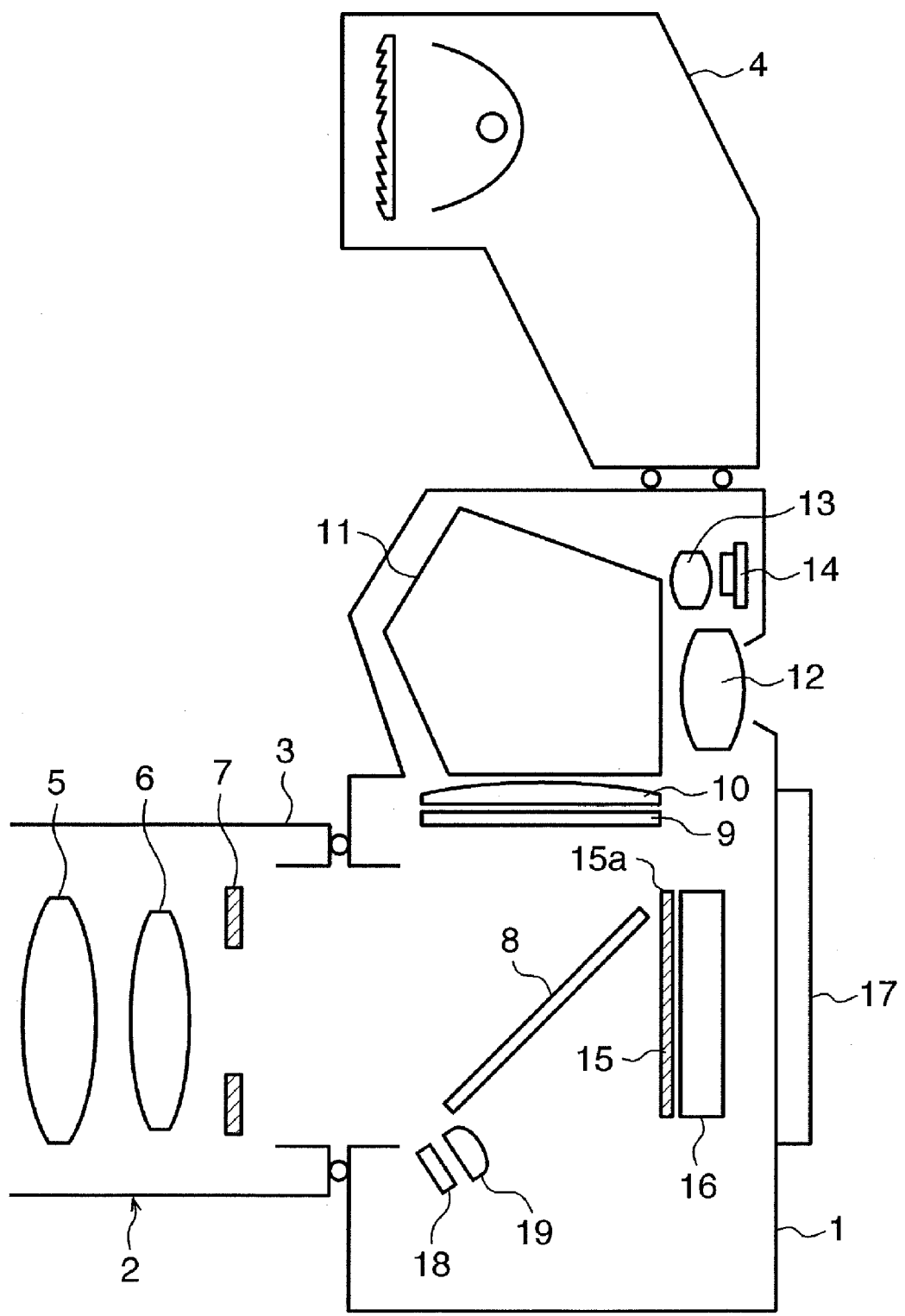
FIG. 1 is a sectional view showing the optical arrangement of a single-lens reflex digital camera according to the first embodiment of the present invention.
Figure 2:
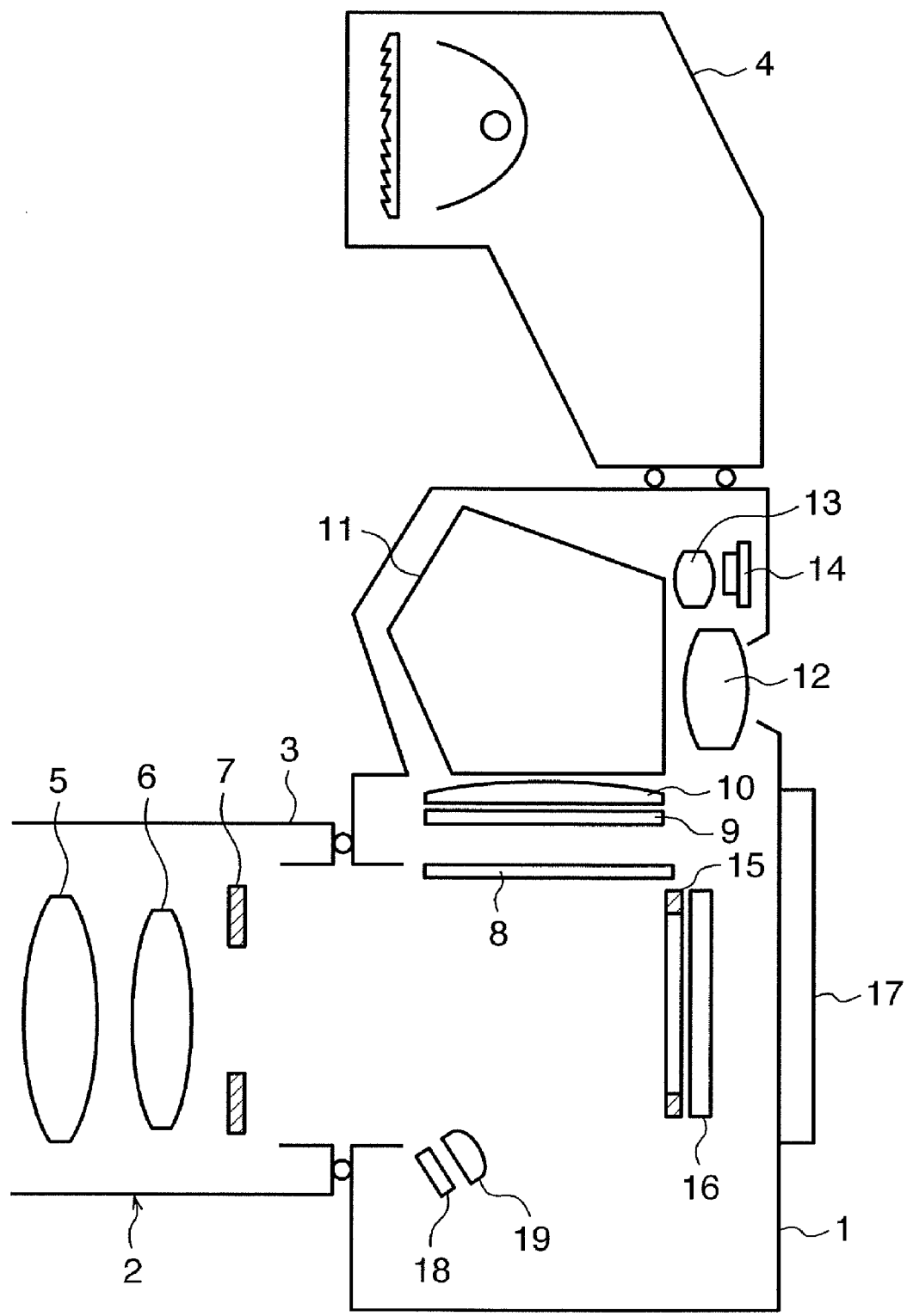
FIG. 2 is a sectional view showing the optical arrangement of the single-lens reflex digital camera according to the first embodiment of the present invention.

FIGS. 1 and 2 are sectional views showing the optical arrangement of a single-lens reflex digital camera according to the first embodiment of the present invention.

In FIGS. 1 and 2, a photographing lens 2 detachable from a camera body 1 is fixed to the camera body 1 via a mount 3. A demountable flash unit 4 is connectable to the camera body 1. The camera body 1 may incorporate the flash unit 4. The photographing lens 2 comprises a lens 5 for zooming, a lens 6 for focusing, and an aperture stop 7.

A light beam having passed from an object through the photographing lens 2 is reflected upward by a quick return mirror 8, forming an image via a focusing screen 9 and condenser lens 10. Then, the light beam is diffused and observed as a field image by the photographer via a pentaprism 11 and eyepiece lens 12.

Part of the light beam having passed through the pentaprism 11 is guided to a photometry sensor 14 via a photometry lens 13.

In the shooting mode and live view mode (electronic viewfinder mode), the quick return mirror 8 flips up toward the focusing screen 9, as shown in FIG. 2. A light beam having passed from an object through the photographing lens 2 enters an image sensor 16 arranged immediately behind a shutter front curtain 15. The image sensor 16 converts the light beam into an image signal, and performs predetermined image processing. The resultant image signal is displayed on a display 17, or recorded as image data on a recording medium (not shown).

As a photometry means in flash photography, an exposure control photometry sensor 18 and photometry condenser lens 19 are arranged below the quick return mirror 8. In flash photography, the shutter front curtain 15 of a focal plane shutter 15a reflects light which has been projected from the flash unit 4 by the preflash operation of the flash unit 4 and reflected by an object. The exposure control photometry sensor 18 receives the reflected light to perform photometry. The photometry condenser lens 19 is so positioned as to guide light reflected by the shutter front curtain 15 to the light-receiving surface of the exposure control photometry sensor 18. This is because direct photometry on the image sensor surface is impossible under the influence of reflection by a low-pass filter and cover glass (not shown) arranged in front of the image sensor 16. Instead, photometry is done using reflection by the shutter curtain surface.

In the first embodiment, the camera body 1 comprises both the photometry sensor 14 (to be described later) and the above-described exposure control photometry sensor 18 for descriptive convenience of the second embodiment. However, in the first embodiment, the photometry sensor 14 also performs photometry in flash photography, which will be described later, so the exposure control photometry sensor 18 is not always necessary.

Figure 3:
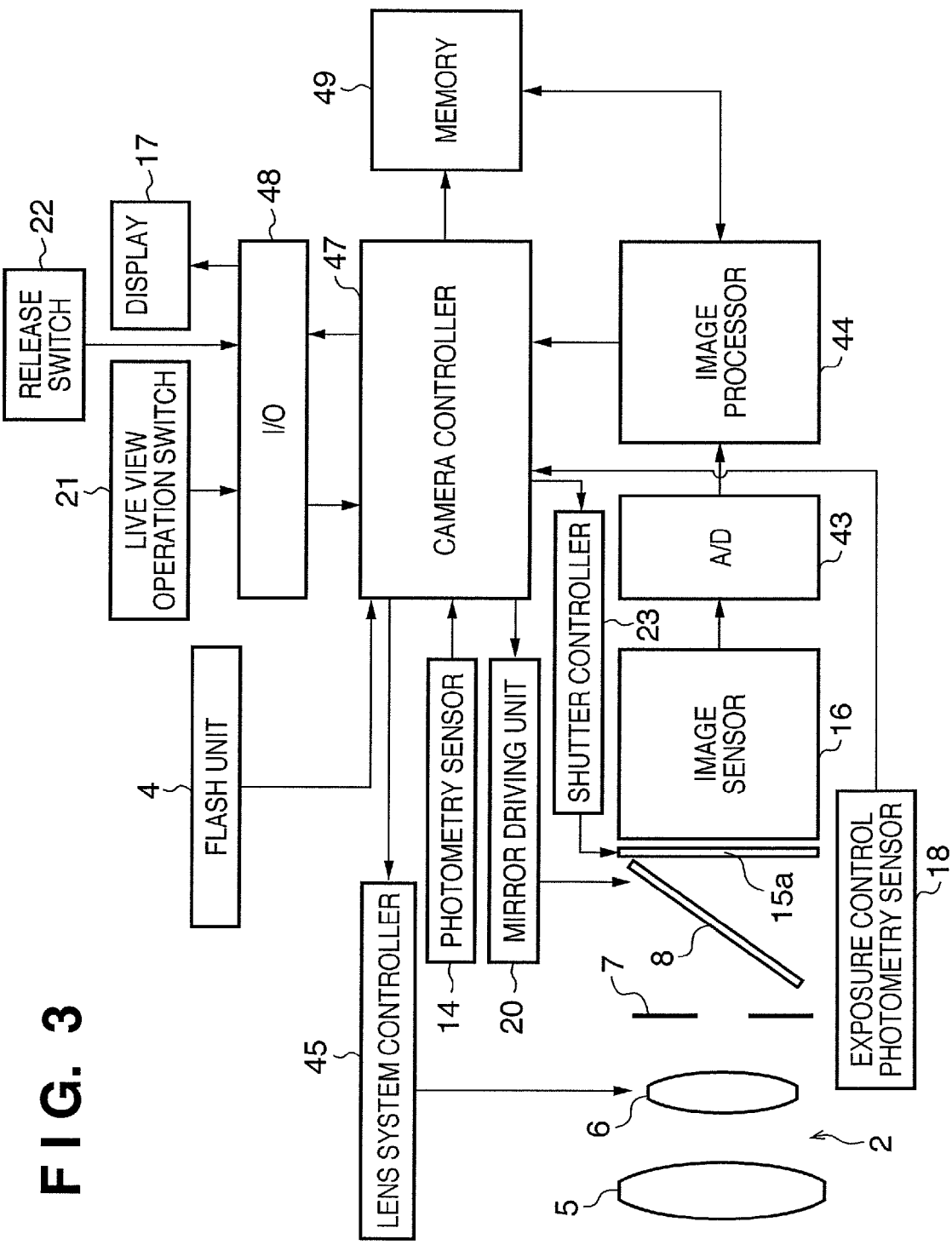
FIG. 3 is a view showing the block arrangement of the single-lens reflex digital camera according to the first embodiment.

FIG. 3 is a view showing the block arrangement of the single-lens reflex digital camera according to the first embodiment.

A description of FIG. 3 partially overlaps with that of FIGS. 1 and 2. In FIG. 3, the photographing lens 2 forms an object image. The aperture stop 7 is incorporated in the photographing lens 2 and adjusts light quantity on the image sensor 16. The image sensor 16 photo-electrically converts an object image. The focal plane shutter 15a is arranged in front of the image sensor 16. An A/D converter 43 converts an analog image signal output from the image sensor 16 into a digital signal. An image processor 44 processes a digital image signal output from the A/D converter 43. A lens system controller 45 controls the position of the photographing lens 2 and the opening degree of the aperture stop. A camera controller 47 controls the operation of the overall digital camera. An I/O 48 controls inputs/outputs to/from a release switch 22, the display 17, a live view operation switch 21, and the like. A memory 49 stores shot images and various types of information. The photometry sensor 14 performs field photometry. The flash unit 4 illuminates an object. The exposure control photometry sensor 18 performs photometry of the field illuminated by the flash unit 4. A mirror driving unit 20 drives the quick return mirror 8. The live view operation switch 21 switches whether to execute live view display of displaying an image obtained by the image sensor 16 in real time. The release switch 22 has a two-step structure. That is, when the release switch 22 is pressed halfway, a shutter switch SW1 is turned on to prepare for photography. When the release switch 22 is pressed fully, a shutter switch SW2 is turned on to shoot an image. A shutter controller 23 controls the focal plane shutter 15a.

A user operation is detected via the I/O 48, and the power ON/OFF operation, photography, or the like is executed in accordance with a user instruction. When the user designates photography, the camera controller 47 determines appropriate photographing conditions on the basis of pieces of information obtained from the photometry sensor 14, exposure control photometry sensor 18, and image sensor 16. The camera controller 47 sets a proper lens position and the like via the lens system controller 45. The camera controller 47 controls the A/D converter 43 to convert an output signal from the image sensor 16 into a digital signal after exposure. The camera controller 47 controls the image processor 44 to perform proper image processing, and saves the resultant signal in the memory 49. If necessary, the camera controller 47 displays an image on the display 17 via the I/O 48.

The image processor 44 generally executes processes such as white balance adjustment, RGB development, and compression encoding.

Figure 4B:
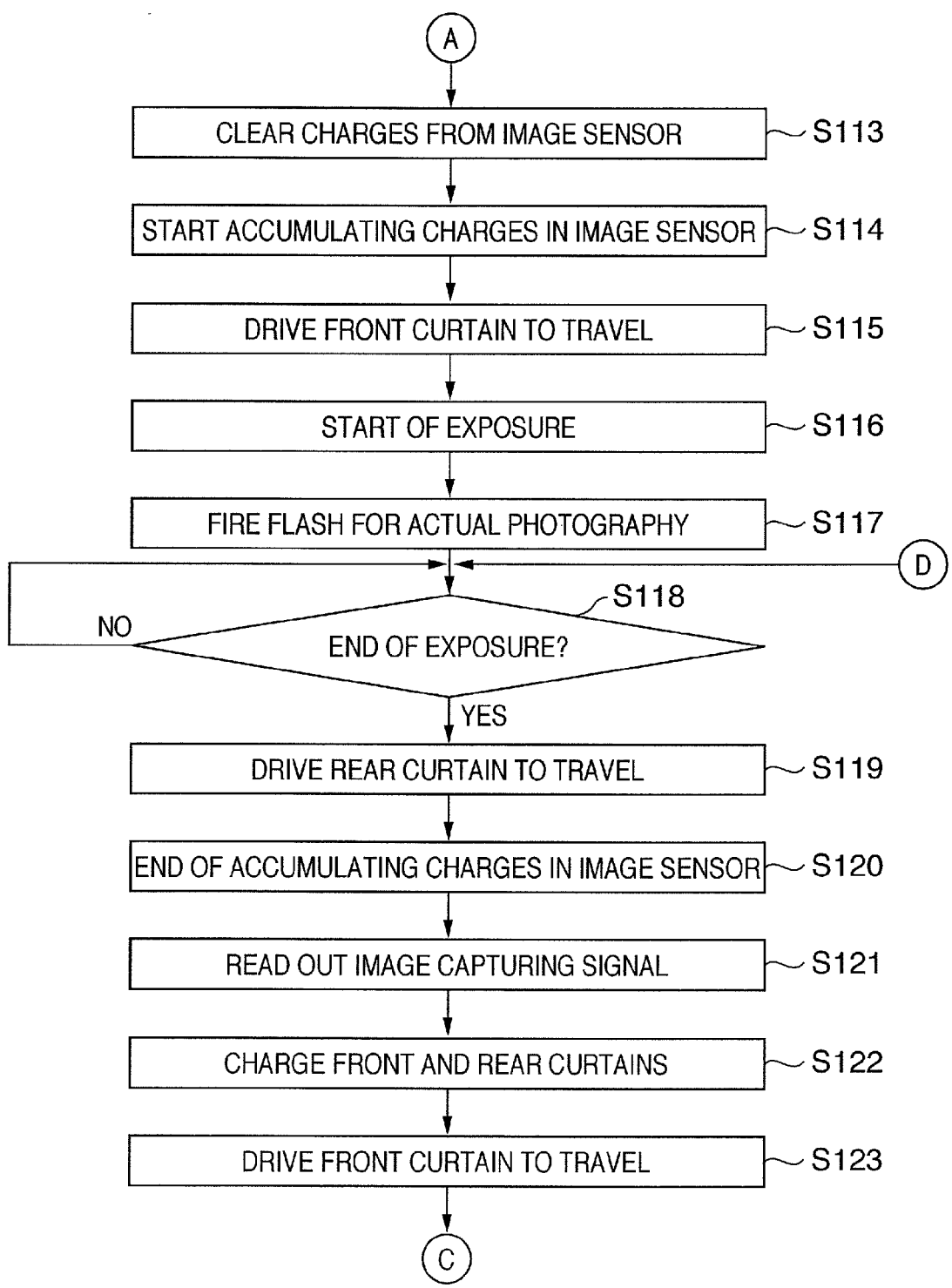
Figure 4C:
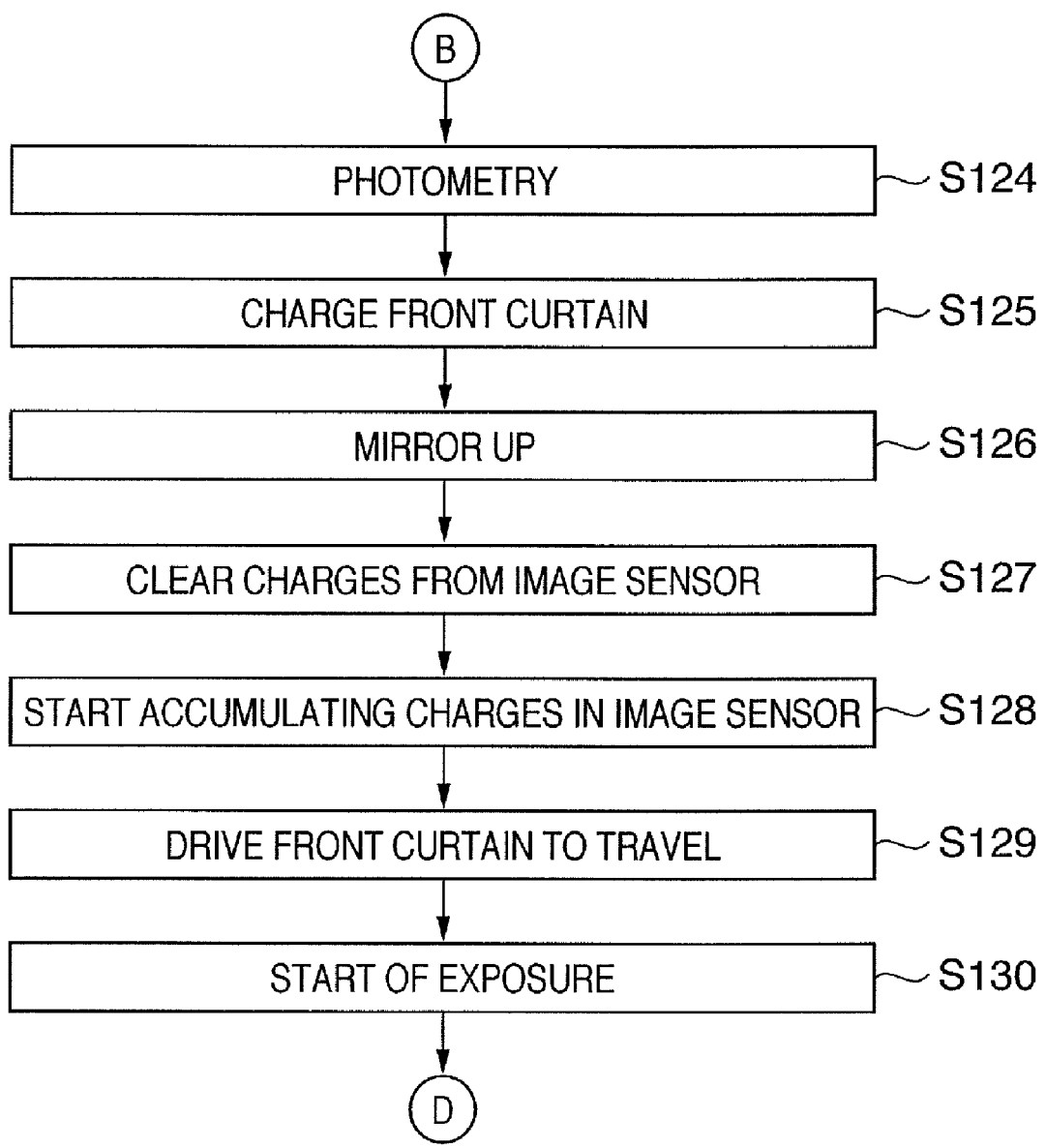

FIGS. 4A-4C are flowcharts showing an operation when the single-lens reflex digital camera according to the first embodiment shoots an image in the live view mode.

A mirror-up sequence till the start of photography in the live view mode will be explained.

The photographer starts up the live view photographing mode by operating the live view operation switch 21 of the camera body 1. After the live view photographing mode starts up, the mirror driving unit 20 retracts (mirror up) the quick return mirror 8 from the image capturing optical system in step S101.

In step S102, the shutter controller 23 drives the shutter front curtain 15 to travel in a direction in which the shutter front curtain 15 opens. Then, the image sensor 16 can receive a light beam from the photographing lens 2. Object light incident on the image sensor 16 is photo-electrically converted and undergoes image processing. In step S103, the display 17 displays the object image in a live view display state.

A photographing sequence in the live view mode will be explained.

In step S104, it is determined whether the photographer has pressed the shutter switch SW1 which, when the release switch 22 is pressed halfway, is turned on to make photographing preparations such as autofocus. If the photographer has pressed the shutter switch SW1, the process advances to step S105.

In step S105, the focus is detected by a contrast detection method using an image signal from the image sensor 16. The lens 6 is focused on the object.

In step S106, it is determined whether the photographer has pressed the shutter switch SW2 which, when the release switch 22 is pressed completely, is turned on to start a series of photographing operations such as exposure of the image sensor 16 and reading of an image capturing signal. If the photographer has pressed the shutter switch SW2, the process advances to step S107.

In step S107, it is determined whether to fire a flash from the flash unit 4. If the flash unit 4 is to fire a flash, the process advances to step S108; if the flash unit 4 is not to fire a flash, to step S124.

In step S108, the shutter controller 23 charges the shutter front curtain 15 which has already traveled. In step S109, the mirror driving unit 20 returns the quick return mirror 8 again into the image capturing optical system (mirror down).

In step S110, the flash unit 4 fires a flash for exposure control (to be referred to as pre-emission or preliminary emission) prior to actual emission.

In step S111, the photometry sensor 14 measures a reflected light beam from the object, and determines the flash quantity of the flash unit 4 in actual photography on the basis of the measurement result.

Upon completion of photometry in step S111, the mirror driving unit 20 retracts the quick return mirror 8 again from the image capturing optical system in step S112.

Then, the camera controller 47 clears charges from the image sensor 16 in step S113, and starts accumulating charges in the image sensor 16 in step S114. In step S115, the shutter controller 23 drives the shutter front curtain 15 to travel. In step S116, exposure of the image sensor 16 starts.

In step S117, the flash unit 4 fires a flash for actual photography (actual emission) in accordance with the flash quantity determined in step S111.

In step S118, the camera controller 47 waits for the end of exposing the image sensor 16 in accordance with photometry data obtained in step S111 (or step S126). In step S119, the shutter controller 23 drives a shutter rear curtain (not shown) to travel and close the shutter.

After the end of accumulating charges in the image sensor 16 in step S120, a charge signal is read out from the image sensor 16 in step S121, and converted into captured image data by predetermined processing.

After a series of processes ends, the shutter controller 23 charges the shutter front curtain 15 and shutter rear curtain in step S122.

In step S123, the shutter front curtain 15 travels for the next photography to prepare for the start of live view photography again.

If the flash unit 4 is not to fire a flash in step S107, the process advances to step S124.

In step S124, photometry is done using an object image sensed by the image sensor 16 similarly to an object image obtained in the live view display state. More specifically, a value at which a proper exposure amount is attained is calculated from the brightness distribution of the sensed image.

In step S125, the shutter controller 23 charges the shutter front curtain 15 which has already traveled.

In step S126, the mirror driving unit 20 retracts the quick return mirror 8 from the image capturing optical system.

The camera controller 47 clears charges from the image sensor 16 in step S127, and starts accumulating charges in the image sensor 16 in step S128. In step S129, the shutter controller 23 drives the shutter front curtain 15 to travel. In step S130, exposure of the image sensor 16 starts. Then, the process advances to step S118.

As described above, according to the first embodiment, the shutter front curtain 15 which has traveled once is charged in the live view photographing sequence, and the photometry sensor 14 executes photometry via the quick return mirror 8. Photometry can be achieved within a very short time during the release sequence. Since the photometry sensor 14 having a wide dynamic range is used, an appropriate photometric value can be attained at high precision. In other words, photometry by a preflash from the flash unit can be accurately performed within a very short time, shortening the time lag from pre-emission to actual emission. In photography without using any flash, photometry is done using the image sensor continuously from the live view display state. The digital camera can quickly shift to actual photography. This can shorten the time lag from the SW2 ON operation representing a photographing instruction to the start of acquiring a shot image.

Second Embodiment

Figure 5A:
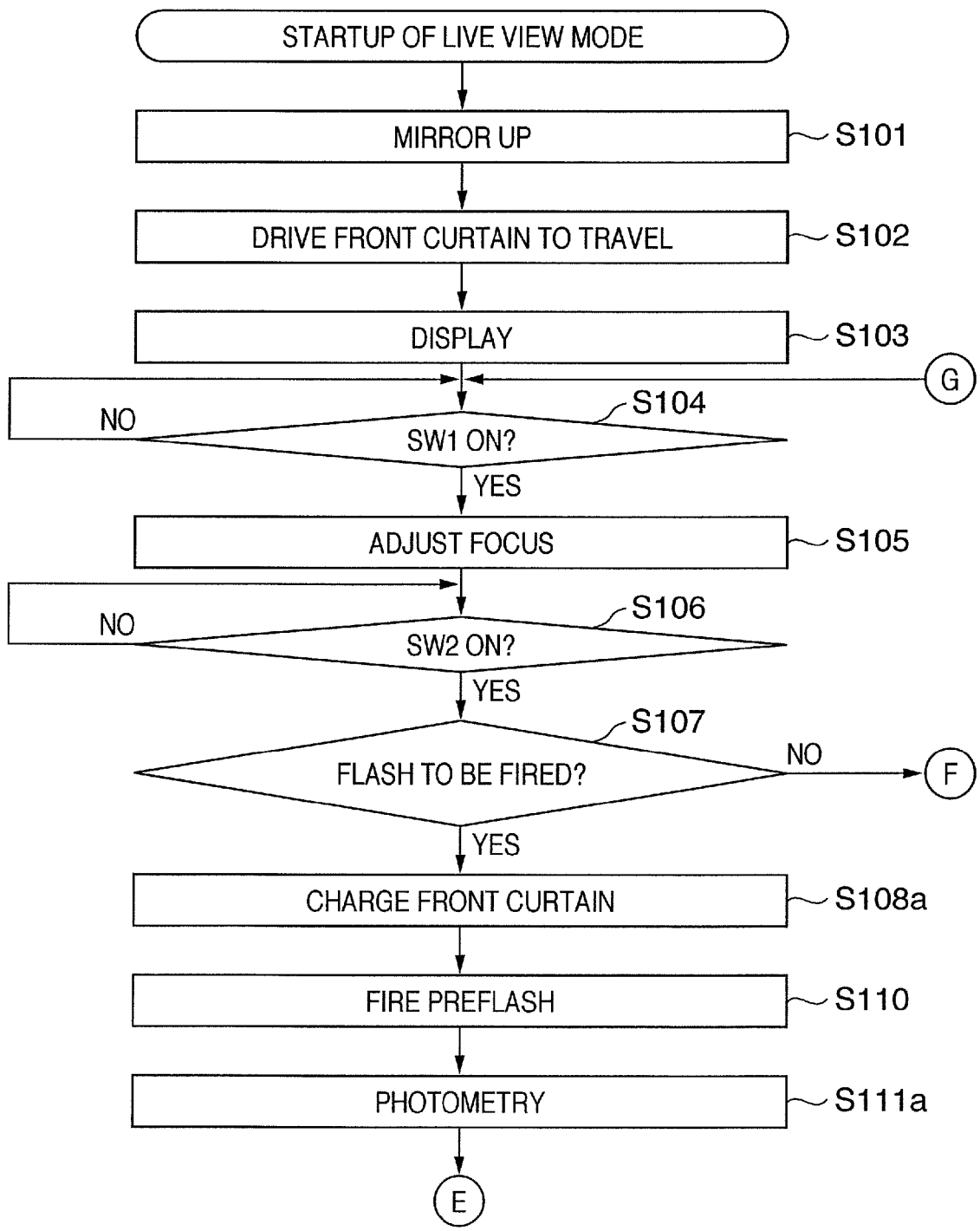
FIGS. 5A-5C are flowcharts showing an operation when a single-lens reflex digital camera according to the second embodiment shoots an image in the live view mode.
Figure 5B:
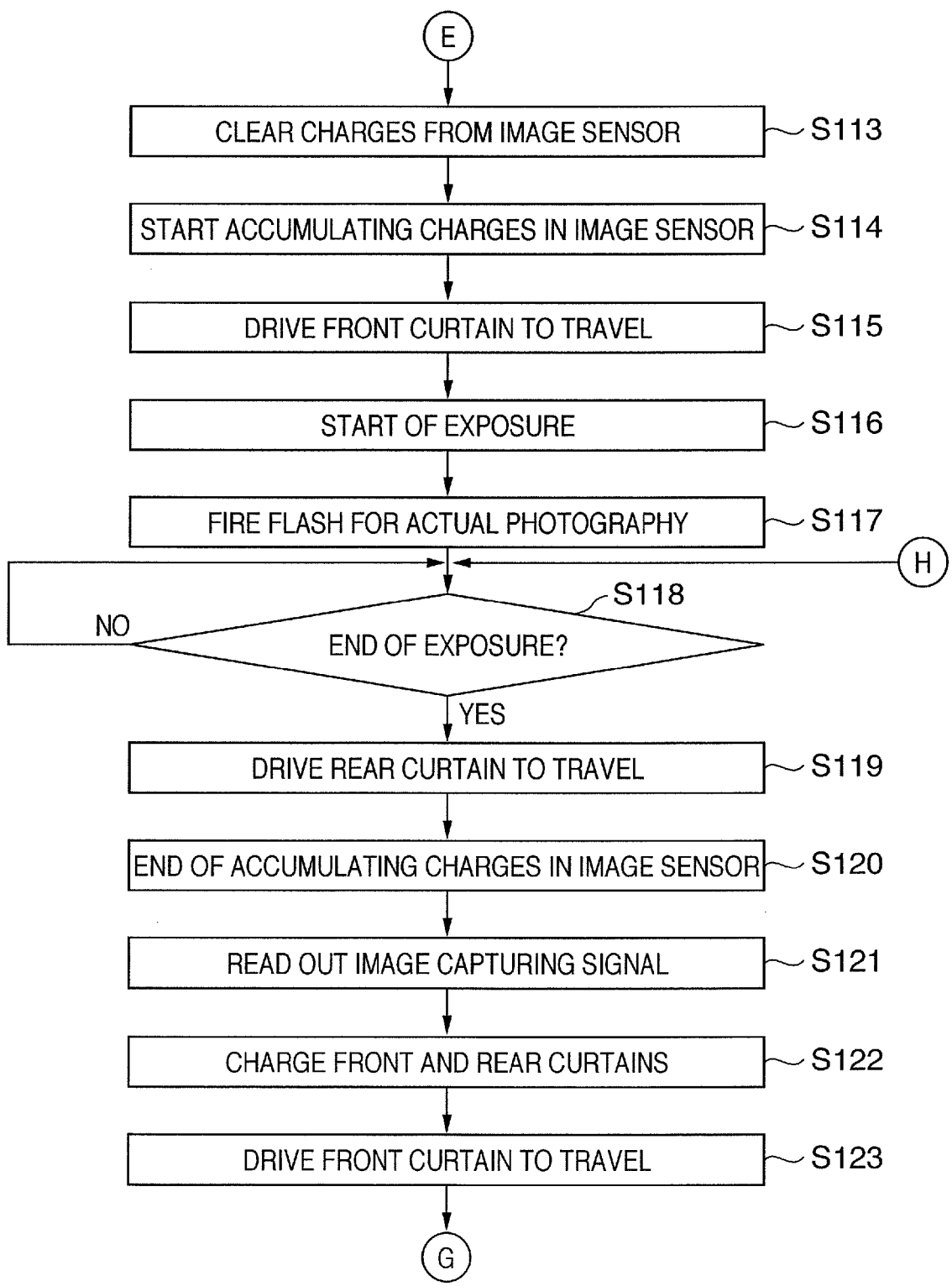
Figure 5C:
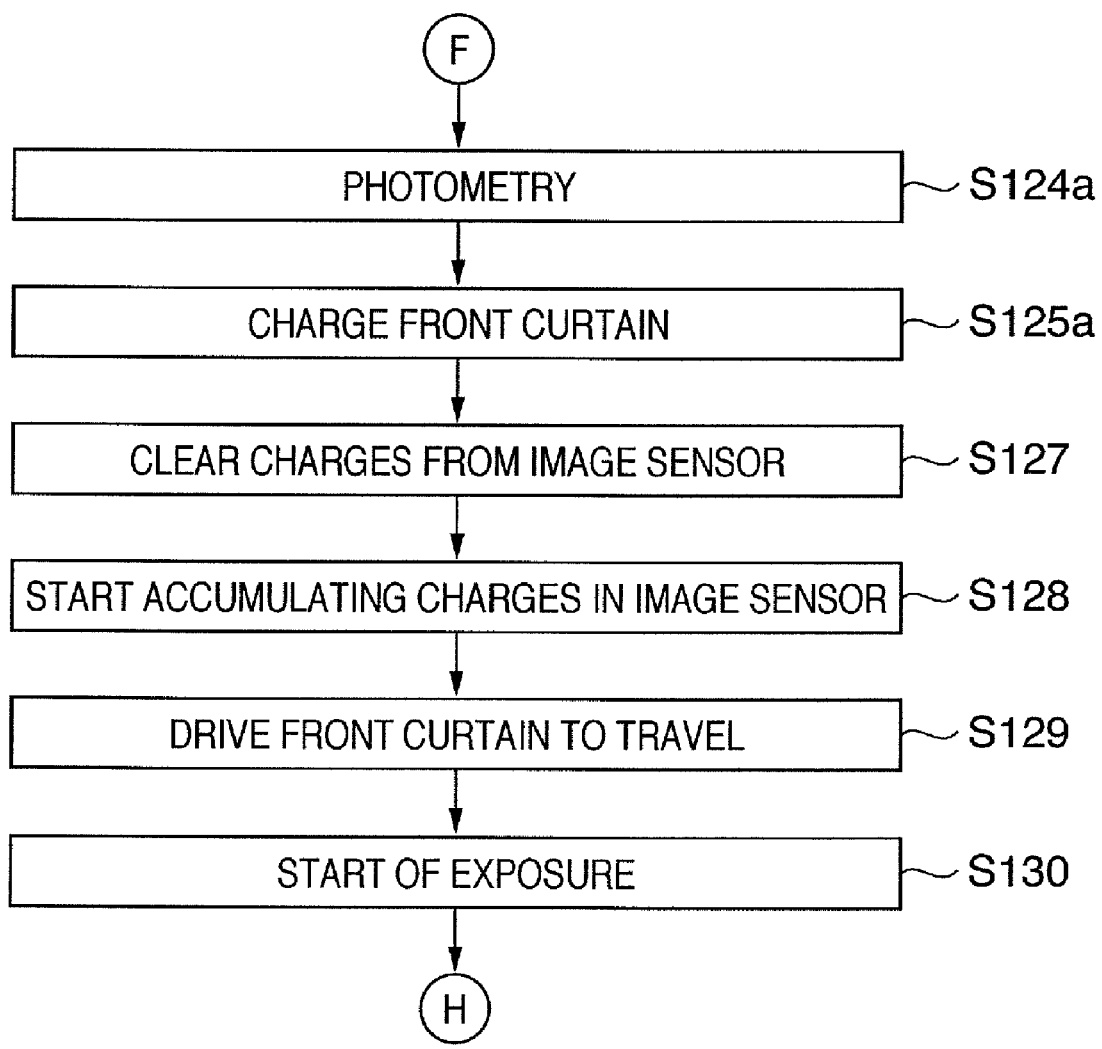

A photographing operation according to the second embodiment of the present invention will be described in detail with reference to FIGS. 5A-5C.

A digital camera according to the second embodiment has the same arrangement as that in the first embodiment, and a description thereof will not be repeated. The same reference numerals as those in FIGS. 4A-4C denote the same operations.

A mirror-up sequence till the start of photography in the live view mode is the same as that in the first embodiment, and a description thereof will not be repeated.

A photographing sequence in the live view mode will be explained.

In step S104, it is determined whether the photographer has pressed a shutter switch SW1 which, when a release switch 22 is pressed halfway, is turned on to make photographing preparations such as autofocus. If the photographer has pressed the shutter switch SW1, the process advances to step S105.

In step S105, the focus is detected by a contrast detection method using an image signal from an image sensor 16. A lens 6 is focused on the object.

In step S106, it is determined whether the photographer has pressed a shutter switch SW2 which, when the release switch 22 is pressed completely, is turned on to start a series of photographing operations such as exposure of the image sensor 16 and reading of an image capturing signal. If the photographer has pressed the shutter switch SW2, the process advances to step S107.

In step S107, it is determined whether to fire a flash from a flash unit 4. If the flash unit 4 is to fire a flash, the process advances to step S108a; if the flash unit 4 is not to fire a flash, to step S124a.

In step S108a, a shutter controller 23 charges a shutter front curtain 15 which has already traveled.

In step S110, the flash unit 4 fires a flash for exposure control (pre-emission) prior to actual emission.

In step S111a, an exposure control photometry sensor 18 measures a light beam which has been reflected by the object and further reflected by the shutter front curtain 15. The exposure control photometry sensor 18 determines the flash quantity of the flash unit 4 in actual photography on the basis of the measurement result.

Then, a camera controller 47 clears charges from the image sensor 16 in step S113, and starts accumulating charges in the image sensor 16 in step S114. In step S115, the shutter controller 23 drives the shutter front curtain 15 to travel. In step S116, exposure of the image sensor 16 starts.

In step S117, the flash unit 4 fires a flash for actual photography (actual emission) in accordance with the flash quantity determined in step S111a.

In step S118, the camera controller 47 waits for the end of exposing the image sensor 16 in accordance with photometry data obtained in step S111a (or step S126). In step S119, the shutter controller 23 drives a shutter rear curtain (not shown) to travel and close the shutter.

After the end of accumulating charges in the image sensor 16 in step S120, a charge signal is read out from the image sensor 16 in step S121, and converted into captured image data by predetermined processing.

After a series of processes ends, the shutter controller 23 charges the shutter front curtain 15 and shutter rear curtain in step S122.

In step S123, the shutter front curtain 15 travels for the next photography to prepare for the start of live view photography again.

If the flash unit 4 is not to fire a flash in step S107, the process advances to step S124a.

In step S124a, photometry is done using an object image sensed by the image sensor 16 similarly to an object image obtained in the live view display state. More specifically, a value at which a proper exposure amount is attained is calculated from the brightness distribution of the sensed image. In step S125a, the shutter controller 23 charges the shutter front curtain 15 which has already traveled, thereby closing the shutter.

The camera controller 47 clears charges from the image sensor 16 in step S127, and starts accumulating charges in the image sensor 16 in step S128. In step S129, the shutter controller 23 drives the shutter front curtain 15 to travel. In step S130, exposure of the image sensor 16 starts. Then, the process advances to step S118.

In this way, according to the second embodiment, the shutter front curtain 15 which has traveled once is charged in the live view photographing sequence, and the exposure control photometry sensor 18 executes photometry. Photometry can be completed within a very short time during the release sequence. Since the exposure control photometry sensor 18 having a wide dynamic range is used, an appropriate photometric value can be attained at high precision. In other words, photometry by a preflash from the flash unit can be accurately performed within a very short time, shortening the time lag from pre-emission to actual emission. Moreover, energy can be saved because no quick return mirror is driven in photometry. In photography without using any flash, photometry is done using the image sensor continuously from the live view display state. The digital camera can quickly shift to actual photography. This can shorten the time lag from the SW2 ON operation representing a photographing instruction to the start of acquiring a shot image.

As has been described above, the embodiments can execute proper photometry within a short time even when a single-lens reflex type image capturing apparatus performs flash photography using an electronic viewfinder.

Other Embodiments

The object of each embodiment is achieved even by the following method. That is, a storage medium (or recording medium) which stores software program codes for implementing the functions of the above-described embodiments is supplied to the system or apparatus. The computer (or CPU or MPU) of the system or apparatus reads out and executes the program codes stored in the storage medium. In this case, the program codes read out from the storage medium implement the functions of the above-described embodiments by themselves, and the storage medium which stores the program codes constitutes the present invention. In addition to the case in which the functions of the above-described embodiments are implemented when the computer executes the readout program codes, the present invention incorporates the following case. That is, the functions of the above-described embodiments are implemented when the operating system (OS) or the like running on the computer performs part or all of actual processing on the basis of the instructions of the program codes.

The present invention also incorporates the following case. That is, the program codes read out from the storage medium are written in the memory of a function expansion card inserted into the computer or a function expansion unit connected to the computer. After that, the functions of the above-described embodiments are implemented when the CPU of the function expansion card or function expansion unit performs part or all of actual processing on the basis of the instructions of the program codes.

When the present invention is applied to the storage medium, the storage medium stores program codes corresponding to the above-described procedures.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-304410, filed Nov. 9, 2006, which is hereby incorporated by reference herein in its entirety.

What is claimed is:

1. An image capturing apparatus comprising:
an image sensor which photo-electrically converts an object image formed via a photographing lens;
a shutter having a shutter front curtain and a shutter rear curtain which are interposed between the photographing lens and said image sensor, the shutter front curtain being opened at a timing to start exposure of said image sensor, and the shutter rear curtain being closed at a timing to end the exposure of said image sensor;
an optical viewfinder which is used to observe an object image using a light beam from the photographing lens;
a quick return mirror which guides a light beam from the photographing lens to said optical viewfinder;
a mirror driving unit adapted to drive and move said quick return mirror between a state in which said quick return mirror is positioned in a photographing optical path and a state in which said quick return mirror is retracted from the photographing optical path;
a photometry sensor which is arranged below said quick return mirror and performs photometry by receiving light that enters from an object via the photographing lens and is reflected by the shutter front curtain;
a display unit adapted to display an object image obtained by said image sensor; and
a control unit adapted to, when the image capturing apparatus is brought to a live view display state in which said display unit sequentially displays object images obtained by said image sensor, control said shutter to open the shutter front curtain and the shutter rear curtain, and control said mirror driving unit to retract said quick return mirror from the photographing optical path; and
an instruction unit adapted to instruct to start photography, wherein, in a case that start of photography is instructed by said instruction unit in the live view display state, when performing the photography using a flash unit which illuminates an object, said control unit controls said shutter to close the shutter front curtain, which is in an open state after the photography instruction, for performing the photometry for the photography by said photometry sensor, and when performing the photography without the flash unit, said control unit controls said shutter to close the shutter front curtain, which is in the open state, after the photometry for the photography by said image sensor is performed after the photography instruction.

2. The apparatus according to claim 1, wherein said control unit controls said shutter to open the shutter front curtain, which is in a closed state after the photometry for the photography has been performed, for starting an exposure operation.

3. The apparatus according to claim 2, wherein in a case that start of the photography is instructed by said instruction unit in the live view display state, said control unit controls said shutter to open the shutter front curtain and the shutter rear curtain after the exposure operation has finished.

4. A method of controlling an image capturing apparatus including an image sensor which photo-electrically converts an object image formed via a photographing lens, a shutter having a shutter front curtain and a shutter rear curtain which are interposed between the photographing lens and the image sensor, the shutter front curtain being opened at a timing to start exposure of the image sensor, and the shutter rear curtain being closed at a timing to end the exposure of the image sensor, an optical viewfinder which is used to observe an object image using a light beam from the photographing lens, a quick return mirror which guides a light beam from the photographing lens to the optical viewfinder, a mirror driving unit adapted to drive and move the quick return mirror between a state in which the quick return mirror is positioned in a photographing optical path and a state in which the quick return mirror is retracted from the photographing optical path, a photometry sensor which is arranged below the quick return mirror and performs photometry by receiving light that enters from an object via the photographing lens and is reflected by the shutter front curtain, a display unit adapted to display an object image obtained by the image sensor, and an instruction unit adapted to instruct to start photography, the method comprising:

the step of, when the image capturing apparatus is brought to a live view display state in which said display unit sequentially displays object images obtained by said image sensor, controlling said shutter to open the shutter front curtain and the shutter rear curtain, and controlling said mirror driving unit to retract said quick return mirror from the photographing optical path, wherein, in a case that start of the photography is instructed by said instruction unit in the live view display state, when performing the photography using a flash unit which illuminates an object, said controlling step controls said shutter to close the shutter front curtain, which is in an open state after the photography instruction, for performing the photometry for the photography by said photometry sensor, and when performing the photography without the flash unit, said control step controls said shutter to close the shutter front curtain, which is in the open state, after the photometry for the photography by said image sensor is performed after the photography instruction.

* * * * *